(12) United States Patent
Kaufman et al.

(10) Patent No.: US 6,402,523 B1
(45) Date of Patent: Jun. 11, 2002

(54) SELECT A STORY BOOK

(75) Inventors: Shari Kaufman, Westport, CT (US); Peter Polick, Hiansville, NY (US)

(73) Assignee: Innovative USA, Inc., Norwalk, CT (US)

(*) Notice: Subject to any disclaimer, the term of this patent is extended or adjusted under 35 U.S.C. 154(b) by 0 days.

(21) Appl. No.: 09/739,724

(22) Filed: Dec. 18, 2000

(51) Int. Cl.[7] ............................................. G09B 25/00
(52) U.S. Cl. ..................... 434/404; 434/405; 446/151; 281/15.1
(58) Field of Search ................... 434/365, 404, 434/405; 281/15.1; 446/147, 151, 152

(56) References Cited

U.S. PATENT DOCUMENTS

| | | | |
|---|---|---|---|
| 2,816,373 A | * 12/1957 | Caddy | .......................... 434/404 |
| 2,917,325 A | * 12/1959 | Sines | .......................... 434/404 |
| 4,537,576 A | 8/1985 | Thorsheim et al. | |
| 4,642,054 A | 2/1987 | Wada | |
| 4,684,135 A | 8/1987 | Bouchal | |
| 4,752,230 A | 6/1988 | Shamizu | |
| 4,854,879 A | 8/1989 | Chang | |
| 4,920,033 A | * 4/1990 | Cress | .......................... 434/198 |
| 5,213,507 A | 5/1993 | Ozrovitz | |
| 5,551,905 A | * 9/1996 | Billings et al. | .............. 446/151 |
| 5,657,992 A | 8/1997 | Bellizzi | |
| 5,713,743 A | 2/1998 | Clements | |
| 5,871,237 A | 2/1999 | Hunt | |

* cited by examiner

Primary Examiner—Kien T. Nguyen
(74) Attorney, Agent, or Firm—Hedman & Costigan, P.C.

(57) ABSTRACT

An improved book, wherein a user engages a dial or other selector device to access at least one page, chapter, part, rhyme or story within the book.

19 Claims, 6 Drawing Sheets

SELECT A STORY BOOK

The present invention relates to a book that is useful as a children's book. More particularly, the present invention is related to a book having a plurality of pages, chapters, parts, rhymes or stories. Most particularly, the present invention is related to a book that has a dial that can be rotated, or other selector device, to enable the user to select and access a given page, chapter, part, rhyme or story within the book and to prevent the user from inadvertently accessing unselected portions of the book.

BACKGROUND OF THE PRESENT INVENTION

A variety of books are currently on the market that are constructed for use by children, and contain several pages, chapters, parts, rhymes or stories. However, in these books, opening to one of the portions requires cumbersome page flipping or looking in a table of contents for a page number. Children just learning to read can be intimidated by numerous pages. These drawbacks can prove quite difficult for a child just learning to read. Thus, it would represent advancement in the art of providing books for use by children if a book was provided that had a means for allowing the user to directly select and access a given page, chapter, part, rhyme, or story within the book. Further, it would represent an advancement in the art if a book was provided that had a means for preventing a user from inadvertently accessing unselected portions of the book and/or losing his or her place in the book.

The prior art contains examples of books including moving parts, however, none of these books enable direct selection of a portion of the book. Thorsheim et al., U.S. Pat. No. 4,537,576, discloses an educational book that includes elements that allow for interaction between graphic information on a page, and graphic information contained on a central rotatable element attached to the back cover. Thorsheim '576, however, does not teach a book with a selector device that allows a user to select and access a given page, chapter, part, rhyme, or story within the book.

Wada, U.S. Pat. No. 4,642,054, discloses a picture book having a telephone dial structure attached on the inside surface of the back cover of the book. The front cover and all of the pages between the front and back covers have cutouts in the shape of the telephone dial structure. Thus, the structure always appears in any open position of the book. Wada '054, however, does not suggest the use of a selector device that allows a user to select and access a given page, chapter, part, rhyme, or story within the book.

Chang, U.S. Pat. No. 4,854,879, teaches a book for children having a plurality of electronic teaching units that can be selected by the user. The book consists of question pages and an answer page unit. The invention provides a self-teaching children's book with an electronic device that indicates whether the answer choice of a user is correct. Chang '879, however, does not teach the use of a selector device that allows a user to select and access a given page, chapter, part, section, rhyme, or story within the book.

Hunt, U.S. Pat. No. 5,871,237, discloses a children's book that includes at least one page provided with a rotatable movable page portion. The movable portion of the page is rotatable between the position in which the page is normally configured and an extended position in which a portion of the inner picture is exposed. The rotatable movable page portion, however, is not designed to function as a selector device.

Ozrovitz, U.S. Pat. No. 5,213,507, describes an instructional children's storybook that has a page equipped with a puzzle on its reverse side. The puzzle has a plurality of interlocking puzzle pieces. The object of the invention being a children's story book that develops hand and eye coordination. Clements, U.S. Pat. No. 5,713,743, discloses a flip over picture book. The pictures of the book are disposed such that the person listening to the story sees the first sides of the pages and their respective pictures while the storyteller sees the second side (or flip) sides of the pages that contain text relating to their respective first sides viewed by the listener. Although the inventions of Ozrovitz and Clements may allow a user to access information within the book from a page elsewhere in the book, the access is limited to that contained on the back of the page in use. Neither Ozrovitz '507, nor Clements '743 teach a book with a selector device.

Accordingly, although there are books that contain movable parts for enhancing the reader's enjoyment of a book, none of the prior art books provide for directly selecting and accessing a portion of the book. Thus, it would represent an advancement in the art of providing books for children if a book was provided that has a dial that can be rotated, or other selector device, to enable the user to select and access a given page, chapter, part, rhyme or story within the book. Further, the invention would provide children with a useful, easy and/or entertaining way to select and access a given page, chapter, part, rhyme or story within a book. In addition, the present invention would provide a book that allows a user to easily and directly access his or her favorite page, chapter, part, rhyme or story within the book. Further, the invention would provide a book that prevents a user from inadvertently accessing unselected portions of the book and/or losing his or her selected place in the book.

SUMMARY OF THE INVENTION

It is an object of the present invention to provide a book that has more than one page, chapter, part, rhyme or story.

It is a further object of the present invention to provide a book that contains a plurality of pages, chapters, parts, rhymes or stories.

It is still another object of the present invention to provide a book that allows access to at least one given page, chapter, part, rhyme or story within the book.

It is still another object of the present invention to provide a book that allows access to at least one given page, chapter, part, rhyme or story within the book by using a selector device that a user will find useful, easy and/or entertaining to use.

It is still another object of the present invention to provide a book that allows a user to easily access his or her favorite page, chapter, part, rhyme or story within the book.

It is still another object of the present invention to provide a book that prevents a user from inadvertently accessing unselected portions of the book and/or losing his or her selected place in the book.

Accordingly, these objects and others are achieved by the book of the present invention which comprises a front cover; a back cover; a plurality of pages between the front and back covers; a means for binding the front cover, back cover and the pages along at least one side thereof; wherein the plurality of pages are divisible into at least two portions by providing each page of the respective portions with a portion-defining characteristic; and a selector device attached to the book comprising a portion-selector engager, and an index of the portions, whereby movement of the portion-selector engager to an item listed on the index corresponding to a page, chapter, part, rhyme or story within the book provides for the engagement of the portion selector engager with the portion-defining characteristic of the corresponding portion of the book. Preferably, the selector device further comprises a portion de-selector engager whereby movement of the mechanical selector to an item listed on the index provides for the engagement of the portion de-selector engager with the portion-defining characteristic corresponding to the portion subsequent to the selected portion thereby enabling the book to be opened directly to the selected portion of the book and preventing access to the subsequent portions of the book which were not selected.

In a preferred embodiment, the selector device is mechanical and the portion-selector engager comprises a shaft, a rotable dial on one end of the shaft and a flange at the other end of the shaft, whereby rotating the dial to select a given page, chapter, part, rhyme or story from an index or listing of the pages, chapters, parts, rhymes or stories within the book aligns a flange on the portion-selector engager with holes on the pages of the book proceeding the selected page, chapter, section, rhyme or story, so as to enable the user to directly open the book to the selected page or the first page of the selected page, chapter, part, rhyme or story. In another preferred embodiment, the mechanical selector also comprises a portion de-selector engager whereby rotating the dial also aligns a second flange connected to the portion de-selector engager with holes on the pages of the book subsequent to the selected page, chapter, section, rhyme or story, so as to prevent the user from accessing the portions of the book subsequent to the selected page, chapter, section, rhyme or story.

DETAILED DESCRIPTION OF THE PRESENT INVENTION AND DESCRIPTION OF THE PREFERRED EMBODIMENTS

The following description of preferred embodiments is presented to illustrate the present invention and is not to be construed to limit the claims in any manner whatsoever.

Figure 1:
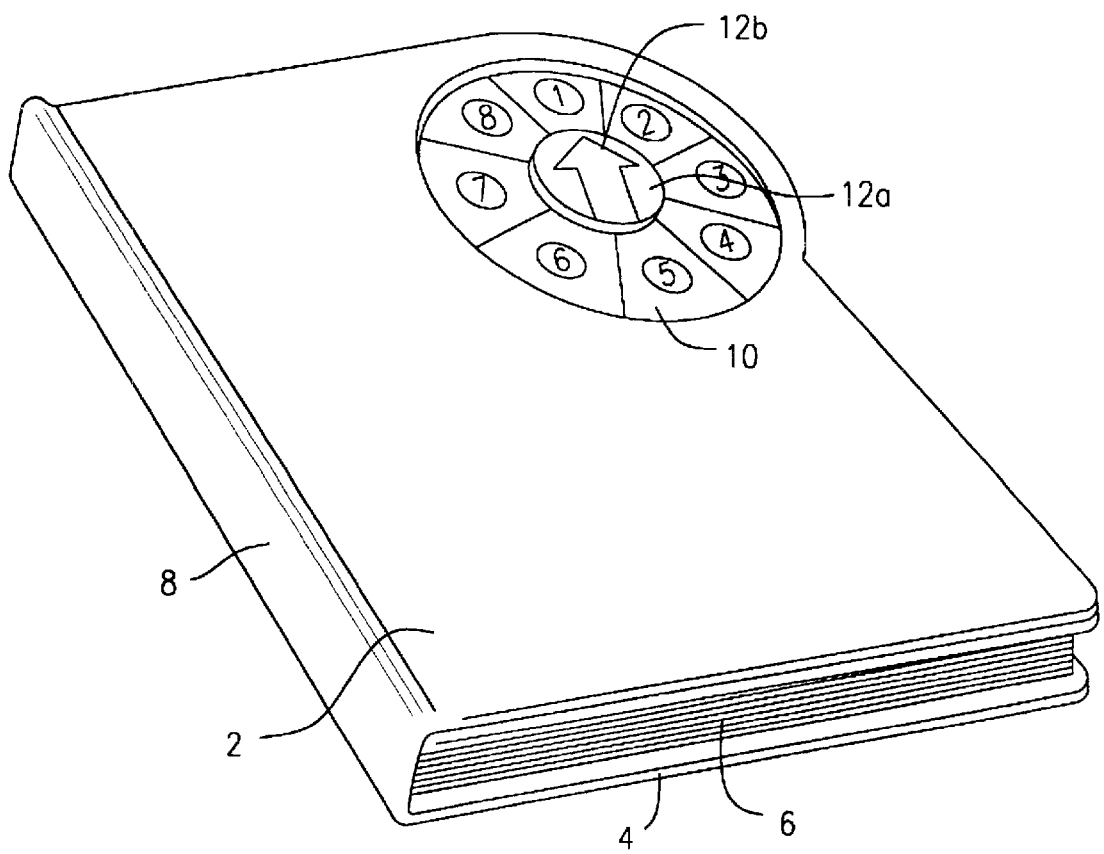
FIG. 1 depicts an offset view of a preferred embodiment of a book of the present invention in the closed position.

FIG. 1 depicts an offset view of a preferred embodiment of a book of the present invention in the closed position, which comprises a front cover 2, a back cover 4, and at least one page 6, being bound along at least one side by a binding means 8 to form the book. The dimensions of the back and front cover are preferably about 11.75 inches in length and about 9.25 inches in width, although any desired dimensions may be employed. The dimensions of the pages are preferably about 11.50 inches in length and about 9.0 inches in width, although any desired dimensions may be employed. In other preferred embodiments, the length and width of the right side of the front cover, the back cover and each page may extend by about 1.0 inch to accommodate the selector device of the present invention.

Preferably, the binding of the front cover 2, back cover 4, and page(s) 6 to the binding means 8 is effected with a suitable binding method such as those known to persons of ordinary skill in the art. An exemplary suitable binding system would comprise heat melt, glue adhesion methodology or a combination thereof. Alternatively, other suitable binding means may be employed, such as, for example, ring binding, male/female mating type bindings, spiral bindings, stitching, sewing and slide-on type clip bindings.

The front cover 2 and the back cover 4 may be constructed of any material known to those skilled in the art that provides sufficient rigidity and printability. These materials may include, but are not limited to, paper or cardboard. Especially preferred is laminated cardboard. The pages 6 likewise may be constructed of any material known to those skilled in the art that provides sufficient rigidity and printability. These materials may include, but are not limited to, paper or cardboard. Especially preferred is laminated cardboard. It is also contemplated by the present invention that the front cover 2, interior pages 6 and the back cover 8 might each be of a different thickness, however, in other embodiments of the present invention, each of the aforementioned components may be of, or of an approximately, equal thickness.

The front cover 2 has a recess to accommodate an index 10 of portions of the book, and a rotatable dial 12a with a pointing means 12b, such as an arrow label, for pointing to desired portion as listed on the index 10. Other portion indicating means are within the scope of the claims. In the preferred embodiment of FIG. 1, the index is circular, is in a recess in the front cover of the book and allows a user to choose from eight (8) possible pages, chapters, parts, rhymes or stories within the book. Other shape indices are contemplated as being within the scope of the claims such as linear or semi-circular indices. Also, the number of possible pages, chapters, parts, rhymes or stories within the book may vary from two (2) to about ten (10) or more. Six (6) or eight (8) possible pages, chapters, parts, rhymes or stories are generally preferred, although any number desired may be employed.

Figure 2:
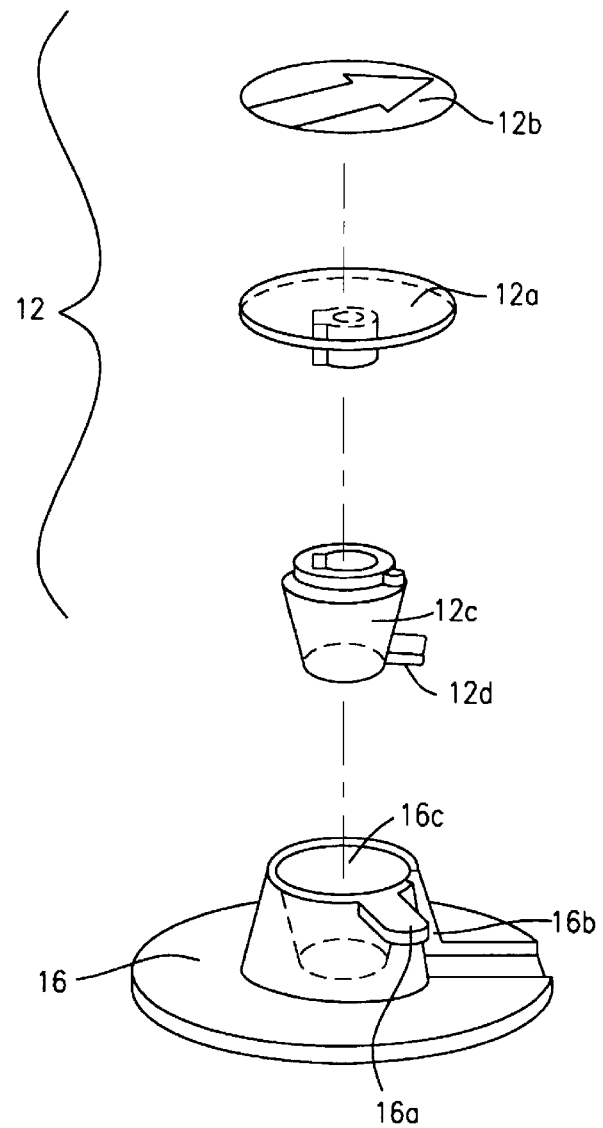
FIG. 2 depicts an exploded cross-section view of a preferred embodiment of the selector device for the present invention.
Figure 2:
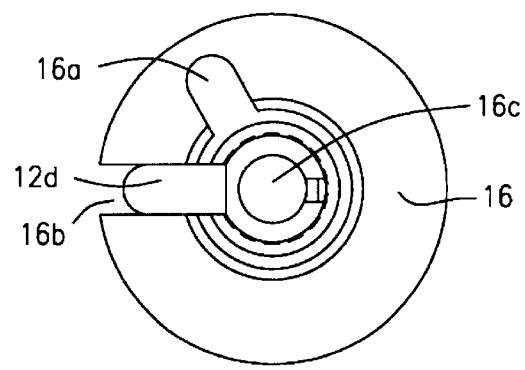

FIG. 2 depicts a cross-sectional view of a preferred embodiment of a mechanical selector device, exclusive of the index 10, of the present invention. The mechanical selector is comprised of an index 10, a portion-selector engager 12 and a portion de-selector engager 16. The portion-selector engager 12 is comprised of a dial 12a; a pointing means 12b, such as an arrow label; a shaft 12c; and a flange 12d. The shaft 12c is affixed to the dial 12a at one end. Attached to the other end of the shaft is a first flange 12d. The dial 12a is affixed to one side of the shaft 12c by any means known to those of ordinary skill in the art such as by use of a mechanical method such as a screw or the use of a suitable adhesive. An exemplary suitable adhesive system would comprise a combination of heat melt and/or glue adhesion technology. When the shaft 12c and the dial 12a are properly affixed to one another, the portion-selector engager is rotatable within the front cover 2 of the book (see FIG. 2A below). The other side of the dial 12a is provided with a pointing means 12b, such as an arrow label, to point to an item on the index corresponding to the desired page, chapter, part, rhyme or story within the book. The portion de-selector engager 16 has a second flange 16a and a groove 16b wherein the flange of the portion-selector engager 12d sits when the book is closed. Further, the portion de-selector engager has an opening 16c that the shaft 12c of the portion-selector engager fits into when the book is closed. The portion de-selector engager is attached to the inside of the back cover of the book 4 in such a manner so that it is rotatable within the inside of the back cover 4 of the book. FIG. 2 also depicts an overview of the portion de-selecter engager 16 that discloses the portion-selector engager flange 12d and the portion-selector, engager shaft 12c within the opening 16c of the portion de-selector engager.

Figure 2A:
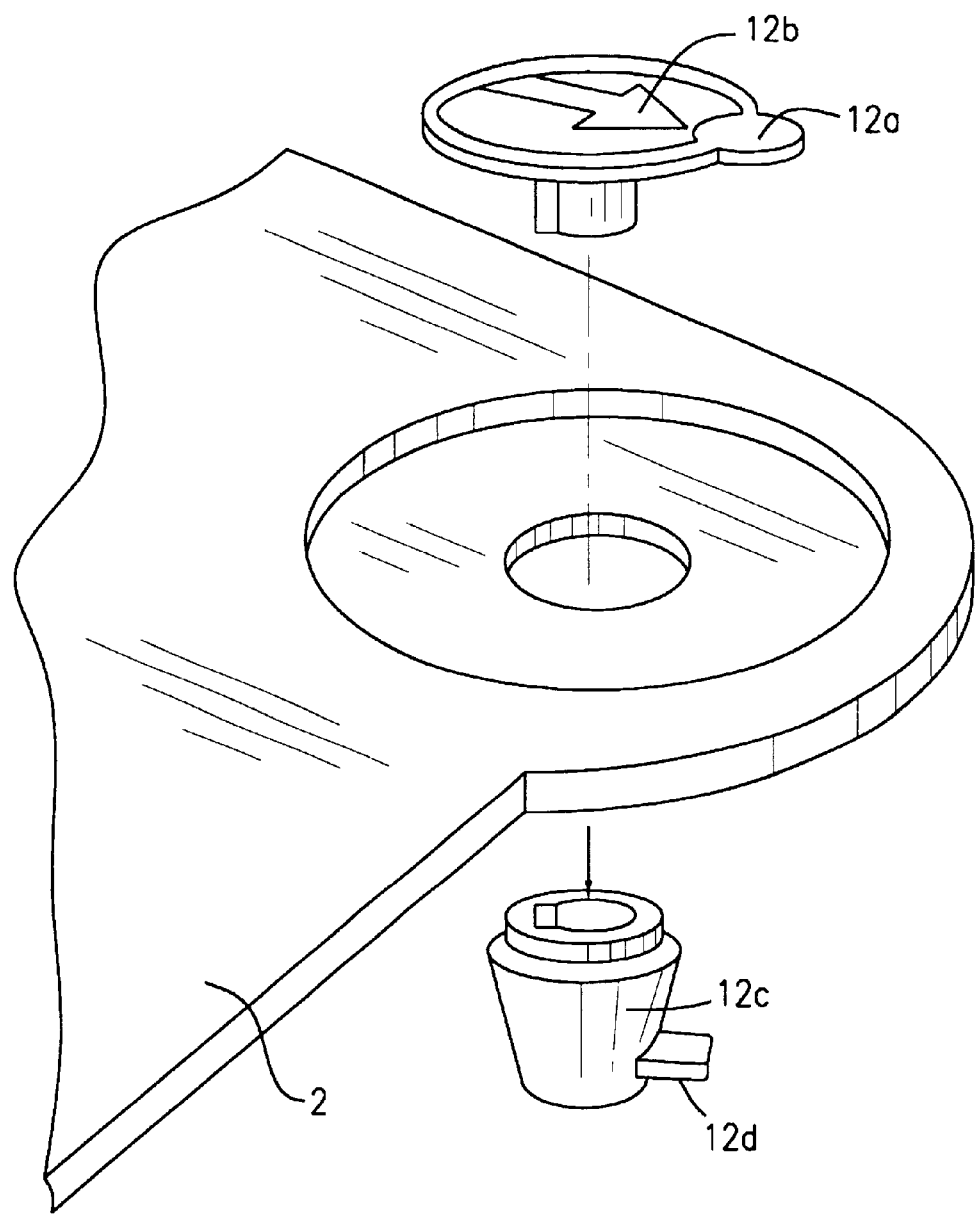
FIG. 2A depicts an exploded view of a preferred embodiement of the part of the mechanical selector device that is attached to the front cover of the book.

FIG. 2A depicts the shaft 12c and the dial 12a with the arrow label 12b. The dial 12a is affixed to one side of the shaft 12c by any means known to those of ordinary skill in the art such as by use of a mechanical method such as a screw or the use of a suitable adhesive. An exemplary suitable adhesive system would comprise a combination of heat melt and/or glue adhesion technology. When the shaft 12c and the dial 12a are properly affixed to one another, the portion-selector engager is rotable within the front cover 2 of the book.

Figure 3:
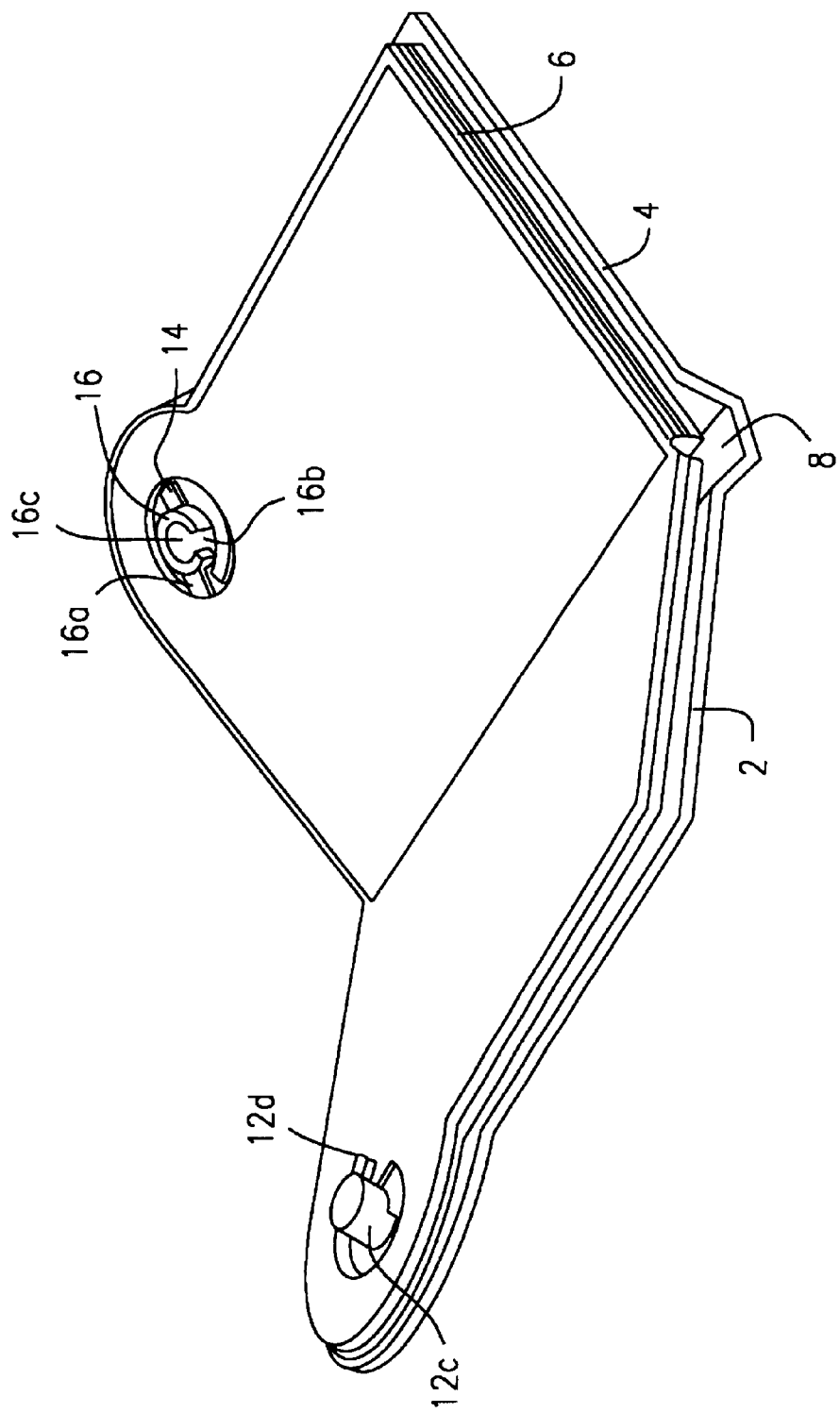
FIG. 3 depicts an offset view of a preferred embodiment of a book of the present invention in the open position.

FIG. 3 depicts an offset view of a preferred embodiment of the present invention as set forth in the description of FIG. 1 in the open position. The figure depicts the front and back covers 2 and 4, as well as a plurality of interior pages 6, the covers and pages being of the same construction as noted above and bound in the same manner as set forth in the description of FIG. 1. FIG. 3 also depicts pages of the book that have die cut holes 14 as the portion-defining characteristic to cooperate with the portion-selector engager 12 and the portion de-selector engager 16 of the mechanical selector (see FIG. 2). The flange 12d of the portion-selector engager cooperates with the die cut hole 14 in the selected page or the die cut holes 14 in the pages of the selected portion of the book. In the preferred embodiment depicted in FIG. 3, each page of each chapter, part, rhyme or story within the book has a hole 14 die cut in a shape different from that of the other pages, chapters, parts, rhymes or stories contained therein so as to allow access thereto by proper positioning of the dial 12a. FIG. 3 also depicts the flange 16d of the portion de-selector engager 16 (see FIG. 2) that cooperates with the die cut hole or holes 14 in the unselected page, or in the pages of the unselected pages, of the book subsequent to the selected pages, chapters, parts, rhymes or stories within the book, and thereby prevents access to those pages.

Figure 3A:
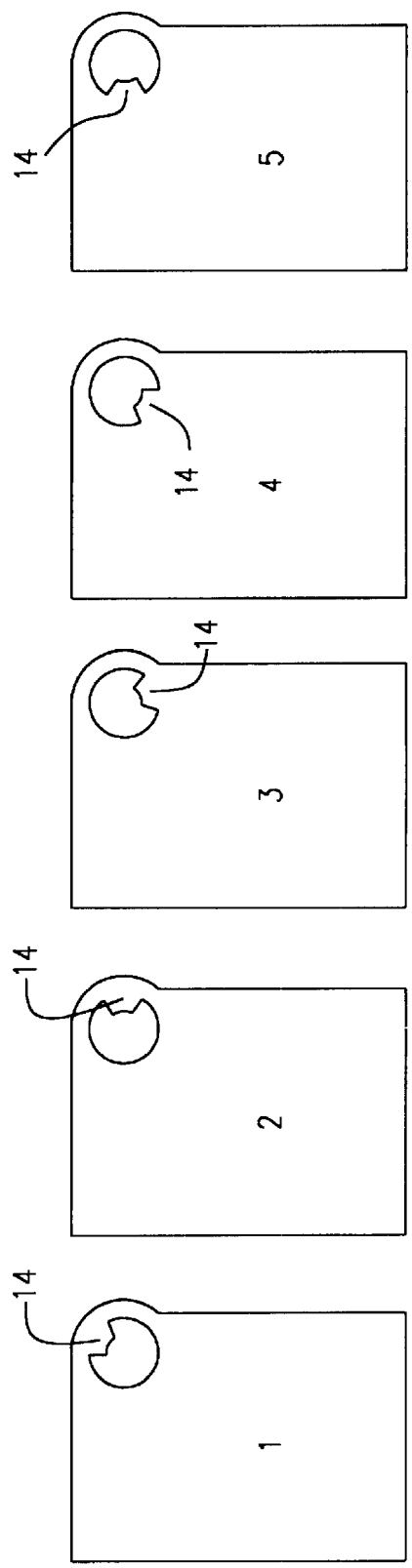
FIG. 3A depicts a preferred embodiement of the pages of the book corresponding to the various portions within the book.

FIG. 3A depicts a preferred embodiment of the pages of the book corresponding to the various portions within the book. The flange 12d of the portion-selector engager cooperates with the die cut hole 14 in the selected page or the die cut holes 14 in the pages of the selected portion of the book. The flange 16d of the portion de-selector engager 16 (see FIG. 2) cooperates with the die cut hole or holes 14 in the unselected page or in the pages of the unselected pages of the book subsequent to the selected pages, chapters, parts, rhymes or stories within the book, and thereby prevents access to those pages.

Figure 4:
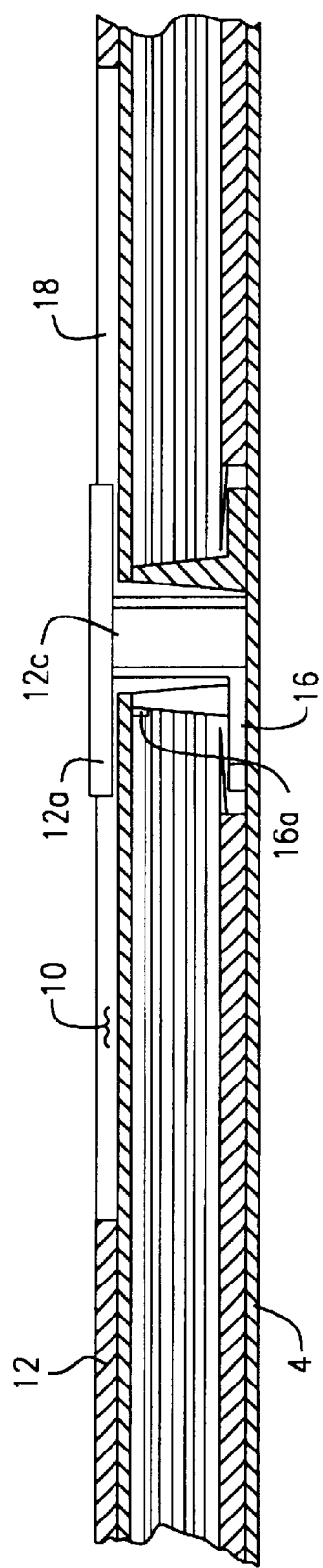
FIG. 4 depicts a cross-sectional view of a preferred embodiment of the present invention wherein the book is closed.

FIG. 4 depicts a cross-section view of a preferred embodiment of the present invention wherein the book is closed. The figure depicts the dial 12a that is rotated to select an item from the index 10, which sits within the circular recess 18 of the cover of the book 2. Attached to the dial 12a is the shaft 12c. Between the shaft 12c and the dial 12a is the front cover 2 of the book. In this preferred embodiment, the dial 12a is placed through a hole in the recess 18 in the front cover 2 and then is affixed to the shaft 12c. When properly affixed, the shaft 12c (and the attached flange 12d not shown) and the portion de-selector engager rotate with the dial 12a located on the front side of the cover 2 of the book when the book is closed. FIG. 4 also depicts the portion de-selector engager 16 and the flange thereon 16a.

All of the above referenced patents, patent applications and publications are hereby incorporated by reference. Many variations of the present invention will suggest themselves to those of ordinary skill in the art in light of the above detailed description. All such modifications are within the full-intended scope of the claims of the present application.

What is claimed is:

1. A book comprising:
    a front cover;
    a back cover;
    a plurality of pages between said front and back covers;
    said front and back covers and said pages being bound along at least one side by a binding means to form said book; wherein said plurality of pages are divisible into at least two portions by providing each page of each said portion with a portion-defining characteristic,
    a mechanical selector attached to said book comprising a portion-selector engager, an index of said portions and a portion de-selector engager, whereby movement of said mechanical selector to an item listed on said index provides for engagement of said portion-selector with said portion-defining characteristic of the indexed portion, thereby enabling opening the book directly to the selected portion and for engagement of said portion de-selector engager with said portion-defining characteristic of a subsequent indexed portion, thereby enabling the user to avoid accessing the portions of the book subsequent to the selected page, chapter, part, section, rhyme or story.

2. A book as defined in claim 1 wherein said mechanical selector is located on the front cover.

3. A book as defined in claim 1 wherein said portions comprise pages within the book.

4. A book as defined in claim 1 wherein said portions comprise chapters.

5. A book as defined in claim 1 wherein said portions comprise sections of the book.

6. A book as defined in claim 1 wherein said portions comprise parts of the book.

7. A book as defined in claim 1 wherein said portions comprise parts of a story within the book.

8. A book as defined in claim 1 wherein said portions comprise rhymes.

9. A book as defined in claim 1 wherein said portions comprise stories.

10. A book as defined in claim 1 wherein each of said portions is preceded by a title page.

11. A book as defined in claim 1 wherein said portion-selector engager comprises a shaft, a rotatable dial at one end of said shaft and a flange at the other end of said shaft, whereby rotating said dial to a part of said index when the book is closed correspondingly (a) rotates said flange to engage the holes of the pages preceding the first page of the selected portion and (b) rotates said portion de-selector to engage the holes of the pages subsequent to the last page of the selected portion.

12. A book as defined in claim 1 wherein said index is circular and said mechanical selector can be rotated up to and including 360 degrees.

13. A book as defined in claim 1 wherein said book has pages divided into from two (2) to eight (8) portions and said mechanical selector allows a user to choose from each said portion.

14. A book as defined in claim 13 wherein said book has pages divided into two (2) portions and said mechanical selector allows a user to choose from said two (2) portions.

15. A book as defined in claim 13 wherein said book has pages divided into six (6) portions and said mechanical selector allows a user to choose from said six (6) portions.

16. A book as defined in claim 13 wherein said book has pages divided into eight (8) portions and said mechanical selector allows a user to choose from said eight (8) portions.

17. A book comprising:

a front cover;

a back cover;

a plurality of pages between said front and back covers;

said front and back covers and said pages being bound along at least one side by a binding means to form said book; wherein said plurality of pages are divisible into at least two portions by providing each page of each said portion with a portion-defining characteristic, wherein said portion-defining characteristic comprises having all of the pages in each of said portions having a hole of the same shape but different from the shape of the holes in pages in different portions; and a mechanical selector attached to said book comprising a portion-selector engager, and an index of said portions, whereby movement of said mechanical selector to an item listed on said index provides for engagement of said portion-selector engager with said portion-defining characteristic of the indexed portion, thereby enabling opening the book directly to the selected portion.

18. A book comprising:

a front cover;

a back cover;

a plurality of pages between said front and back covers;

said front and back covers and said pages being bound along at least one side by a binding means to form said book; wherein said plurality of pages are divisible into at least two portions by providing each page of each said portion with a portion-defining characteristic, and a mechanical selector attached to said book comprising a portion-selector engager, and an index of said portions, wherein said portion-selector engager comprises a shaft, a rotatable dial at one end of said shaft and a flange at the other end of said shaft, whereby rotating said dial to a part of said index when the book is closed correspondingly rotates said flange to engage the holes of the pages preceding the first page of the selected portion; whereby movement of said mechanical selector to an item listed on said index provides for engagement of said portion-selector engager with said portion-defining characteristic of the indexed portion, thereby enabling opening the book directly to the selected portion.

19. A book comprising:

a front cover;

a back cover;

a plurality of pages between said front and back covers;

said front and back covers and said pages being bound along at least one side by a binding means to form said book; wherein said plurality of pages are divisible into at least two portions by providing each page of each said portion with a portion-defining characteristic, and a mechanical selector attached to said book comprising a portion-selector engager comprising a magnet, and an index of said portions, whereby movement of said mechanical selector to an item listed on said index provides for engagement of said portion-selector engager with said portion-defining characteristic of the indexed portion, thereby enabling opening the book directly to the selected portion.

\* \* \* \* \*